(12) United States Patent
Escalera et al.

(10) Patent No.: US 11,691,233 B2
(45) Date of Patent: Jul. 4, 2023

(54) METHOD AND APPARATUS FOR INSERTING WASHERS IN A MOLDED PART

(71) Applicant: R&L MARKETING & SALES, INC., Youngstown, OH (US)

(72) Inventors: Eduardo Escalera, Horizon, TX (US); Ronald N. Kessler, Girard, OH (US)

(73) Assignee: R&L MARKETING & SALES, INC., Youngstown, OH (US)

( * ) Notice: Subject to any disclaimer, the term of this patent is extended or adjusted under 35 U.S.C. 154(b) by 0 days.

(21) Appl. No.: 18/051,556

(22) Filed: Nov. 1, 2022

(65) Prior Publication Data

US 2023/0173625 A1 Jun. 8, 2023

Related U.S. Application Data

(62) Division of application No. 17/842,155, filed on Jun. 16, 2022, now Pat. No. 11,577,350.

(60) Provisional application No. 63/285,253, filed on Dec. 2, 2021.

(51) Int. Cl.
| | | |
|---|---|---|
| *B23P 19/08* | (2006.01) | |
| *B23P 19/10* | (2006.01) | |
| *B25J 15/06* | (2006.01) | |
| *B23P 19/00* | (2006.01) | |
| *B23P 19/12* | (2006.01) | |
| *B65G 47/14* | (2006.01) | |

(52) U.S. Cl.
CPC ............ *B23P 19/10* (2013.01); *B23P 19/004* (2013.01); *B23P 19/08* (2013.01); *B25J 15/0616* (2013.01); *B23P 19/006* (2013.01); *B23P 19/12* (2013.01); *B65G 47/1407* (2013.01); *Y10T 29/49895* (2015.01)

(58) Field of Classification Search
CPC ....... B23P 19/004; B23P 19/006; B23P 19/08; B23P 19/10; B23P 19/12; B65G 47/1407; Y10T 29/49895
See application file for complete search history.

(56) References Cited

U.S. PATENT DOCUMENTS

| | | |
|---|---|---|
| 5,036,569 A | 8/1991 | Linnecke |
| 5,095,615 A | 3/1992 | Weon |
| 2017/0157724 A1 | 6/2017 | Ye et al. |
| 2021/0347014 A1 | 11/2021 | Buhager et al. |

*Primary Examiner* — Jermie E Cozart
(74) *Attorney, Agent, or Firm* — Sand, Sebolt & Wernow Co., LPA (57) ABSTRACT

An automated insertion system for inserting or combining one or more fastener components with a molded part. The automated insertion system can handle multiple fastener components repeatedly, and do so faster and more safely than current processes.

10 Claims, 10 Drawing Sheets

METHOD AND APPARATUS FOR INSERTING WASHERS IN A MOLDED PART

CROSS REFERENCE TO RELATED APPLICATIONS

This application is a Divisional of U.S. Application Ser. No. 17/842,155, filed Jun. 16, 2022, which claims the benefit of U.S. Provisional Application Ser. No. 63/285,253, filed on Dec. 2, 2021, the entire disclosures of which are incorporated herein by reference.

TECHNICAL FIELD

The present disclosure relates generally to the field of molded products. More particularly, in one example, the present disclosure relates to an apparatus and method for inserting washers or the like into molded products. Specifically, in another example, the present disclosure relates to an automated system for inserting washers or the like into designated receivers within a molded product.

BACKGROUND

Background Information

Molding is a well-known manufacturing process that is commonly used to produce large quantities of identical items. It is typical that these items are used as parts in larger articles of manufacture. According to one aspect, molded parts may be utilized in constructing larger items ranging from small consumer goods to large commercial goods and/or parts therefor. Molding, as a process, is well-known and is utilized across many industries.

Often, as molded parts form part of a larger article, these parts are joined to other elements or components, which are commonly formed of other materials. Accordingly, mechanical fasteners are often employed to facilitate these connections. In one example, ladders, which may be used for residential and/or commercial purposes, are typically formed of a lightweight but durable and strong material, such as aluminum or the like, and tend to include additional molded parts such as braces, feet, trays, rung caps, or the like. In many instances, these additional parts are molded products formed of a different material such as plastics, polymers, rubber, or other similar materials. As such, these parts are formed separately and assembled together utilizing mechanical fasteners such as bolts, washers, and/or nuts to secure such parts together.

Current assembly processes often provide these mechanical fasteners late in the manufacturing process and further require a worker or machine to select, align, and insert such fasteners into their designated locations before securing these parts together. This can increase the cost and processing time of assembling larger articles with molded components.

In other instances, current systems may provide one or more elements of these fasteners fixed within a molded part. For example, some molded parts may include a washer and/or nut secured therein to further speed the assembly process of the end article. In such instances, it is typical that the molded part is first provided and then a mechanical fastener component, such as a washer, may be placed within the molded part before that part is then assimilated into the larger article. The current practice tends to place these fastener components within molded products utilizing manual labor and/or manually operated machines, such as presses. Even using the manually operated machines, it is often the case that each component, such as a washer, is first placed in the proper position by hand, then the machine is used to press the washer into its fitting. Where more than one fastener component is inserted into a molded part, it is typical that the part must be realigned with the press manually before inserting subsequent components. These current processes are slow and expose a manual operator to higher risk of injury as repeated interactions can create more risk. Further, such manual processes increase the labor costs and time associated with manufacturing articles utilizing molded products carrying one or more mechanical fastener components therewith.

SUMMARY

The present disclosure addresses these and other issues by providing an automated insertion system for inserting or combining one or more fastener components with a molded part. The automated insertion system can handle multiple fastener components repeatedly, and do so faster and more safely than current processes.

In one aspect, an exemplary embodiment of the present disclosure may provide an apparatus comprising: a frame; a plurality of motors carried by the frame and in operable connection to a plurality of actuator assemblies; and an insertion assembly having an insertion bracket operable to temporarily engage at least one fastener component, the insertion assembly further operable to insert the at least one fastener component into at least one receiver defined in an associated molded component part; wherein the plurality of motors and actuator assemblies are operable to move the insertion assembly along at least one of a transverse X axis, a vertical Y axis, and a longitudinal Z axis relative to the frame to align the at least one fastener component with the at least one receiver of the associated molded part.

In another aspect, an exemplary embodiment of the present disclosure may provide a method of combining a fastener component with a molded component comprising: inserting a molded component part into an assembly zone of an insertion assembly; engaging a first fastener component with a first insertion arm carried by an insertion bracket of the insertion assembly; rotating the insertion bracket to engage a second fastener component with a second insertion arm of the insertion bracket; moving the insertion assembly in at least one of a transverse X axis, a vertical Y axis, and a longitudinal Z axis relative to a frame of the insertion assembly to align the first fastener component with a first receiver of the molded component part; inserting the first fastener component into the first receiver; rotating the insertion bracket; moving the insertion assembly in at least one of the transverse X axis, the vertical Y axis, and the longitudinal Z axis relative to the frame of the insertion assembly to align the second fastener component with a second receiver of the molded component part; and inserting the second fastener component into the second receiver.

BRIEF DESCRIPTION OF THE SEVERAL VIEWS OF THE DRAWINGS

Similar numbers refer to similar parts throughout the drawings.

DETAILED DESCRIPTION

With reference to FIGS. 1-4, a washer insertion system 10 is shown and will be generally referred to herein as insertion system 10 or simply system 10. System 10 may include a housing 12 having a frame 14, one or more panels 16, a cabinet 18, and benchtop or work surface 20.

Figure 1:
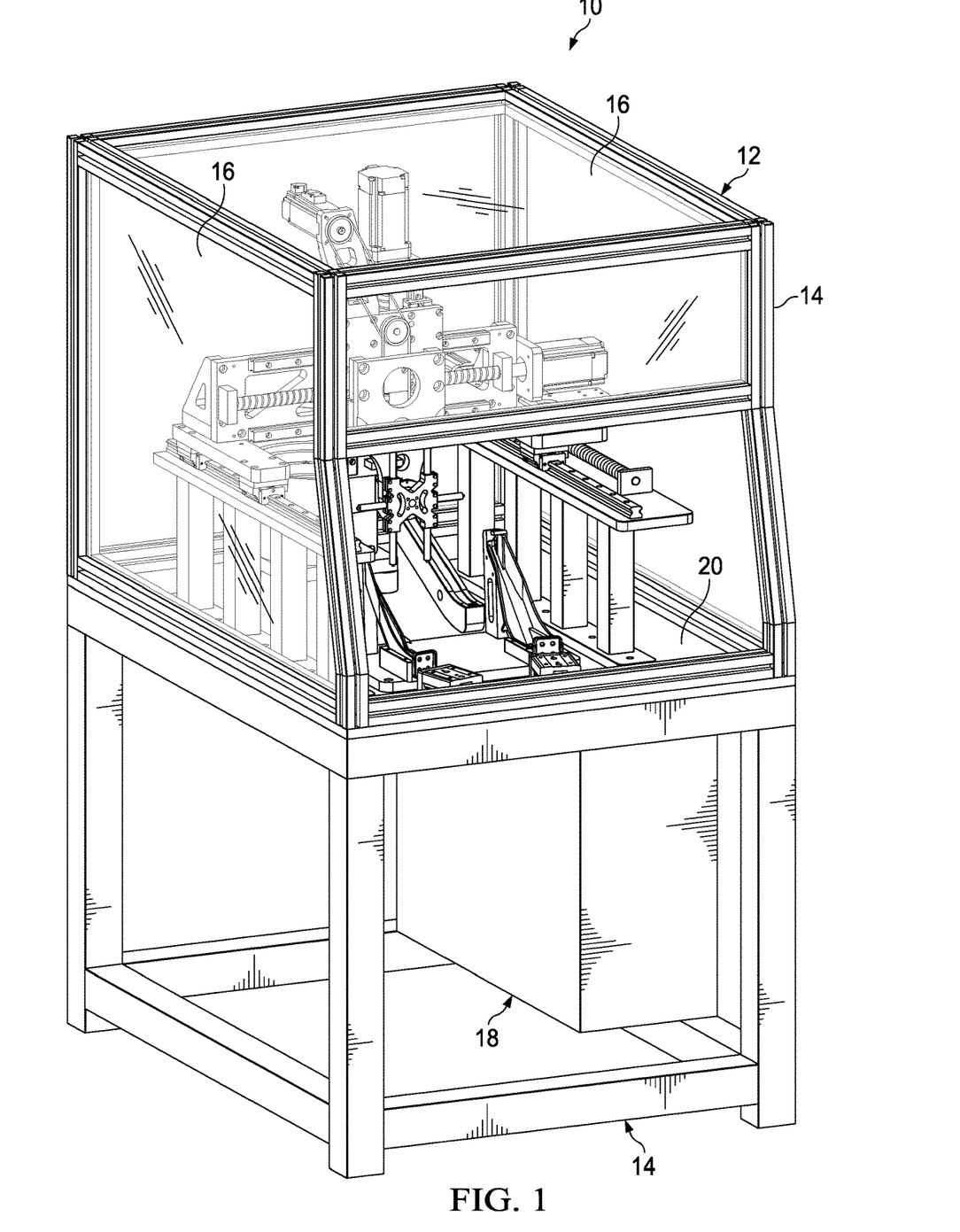
FIG. 1 (FIG. 1) is a top side perspective isometric view of an insertion system according to one aspect of the present disclosure.
Figure 2:
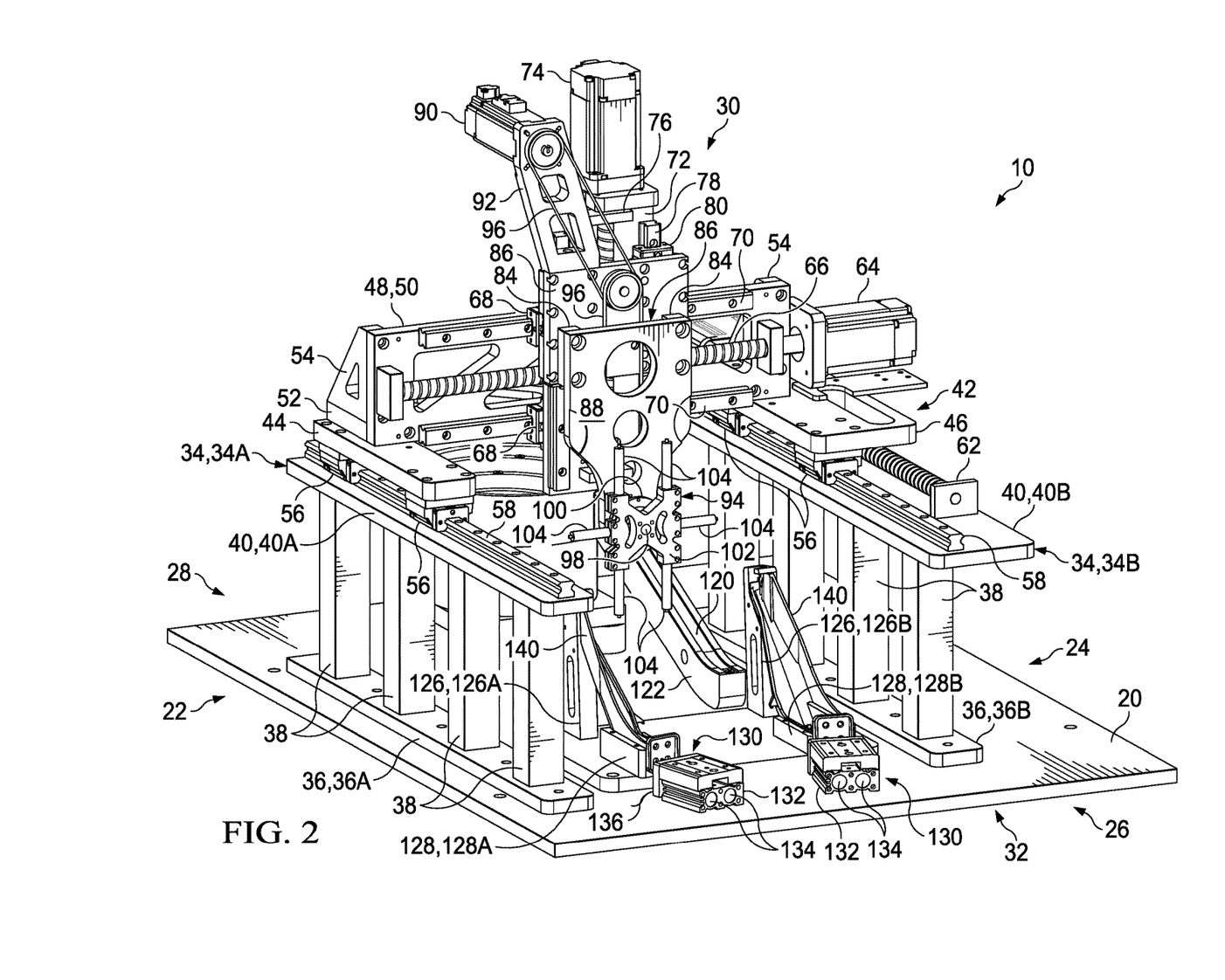
FIG. 2 (FIG. 2) is an enlarged top side isometric perspective view of an insertion system with the frame and housing elements removed according to one aspect of the present disclosure.
Figure 3:
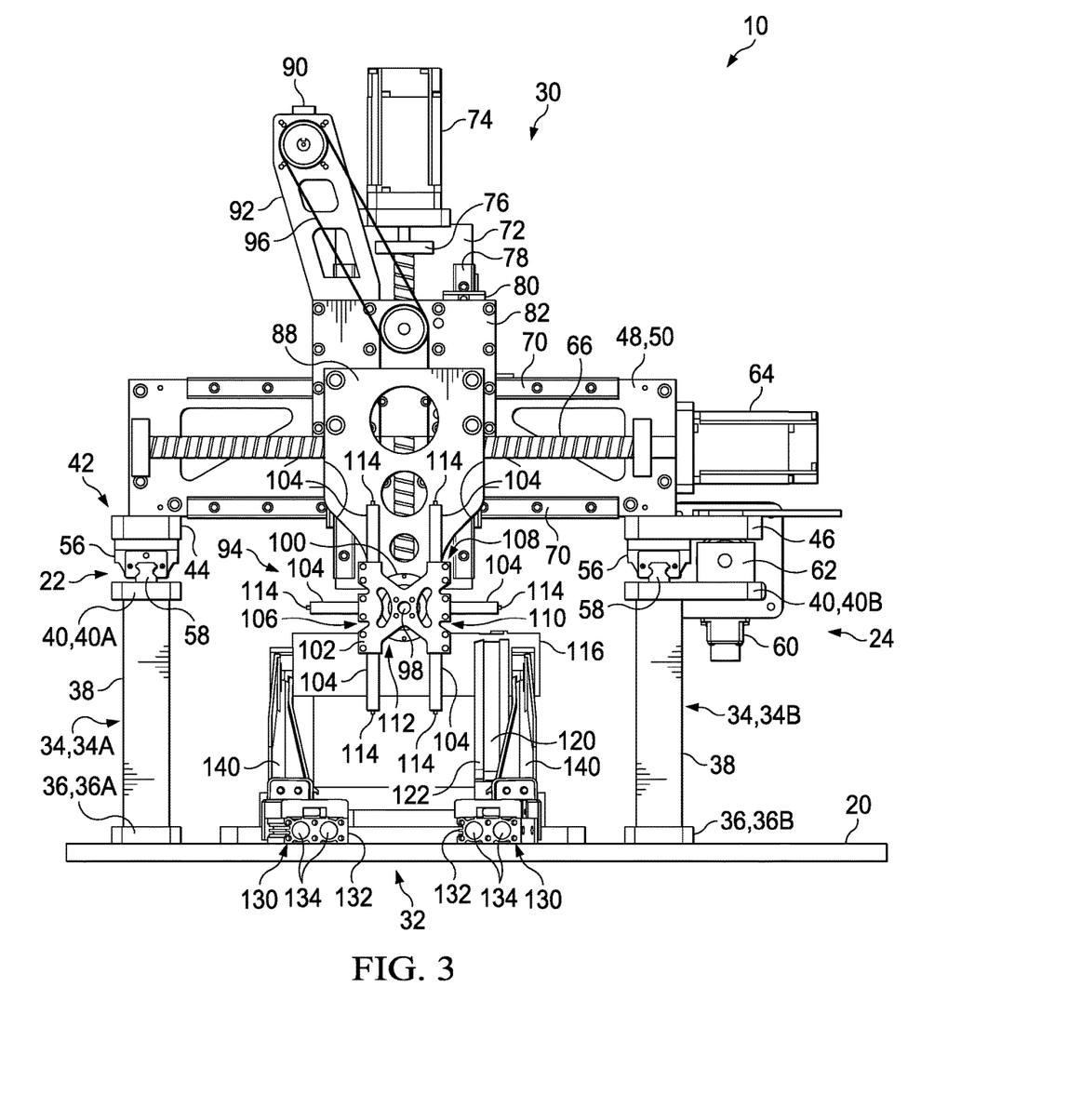
FIG. 3 (FIG. 3) is a front elevation view of an insertion system according to one aspect of the present disclosure.

Frame 14 may be any suitable frame and may include one or more upright members and one or more horizontal members to support the system 10 thereon and/or therein. Panels 16 may further complete housing 12 and may provide a barrier or other enclosure in which the operational portion of system 10 may enclosed. According to one aspect, panel 16 may be Plexiglas or other similar transparent or semi-transparent material or may alternatively include transparent windows therein. According to another aspect, one or more panels 16 may be omitted for access to the interior of housing 12 and the operational components of system 10 as discussed further below.

Cabinet 18 may be a computer cabinet, processor cabinet, or the like and may include one or more processors, logics, series of logics, and any associated electrical or similar components therein. It will be understood that cabinet 18 may be provided in any suitable place, size, and/or configuration within housing 12 as to support the normal and usual operation of system 10 described further below.

Benchtop 20, also referred to herein as work surface 20, may be a generally planar and horizontal surface on which other elements of system 10 may be supported. As used herein, work surface 20 may generally be a tabletop or the like and may be formed of any suitable material. Work surface 20 may further include or otherwise be any suitable surface on which system 10 may be placed, mounted, operated, and/or installed.

Solely for purposes of clarity and simplicity in the disclosure, housing 12, including frame 14, panel 16, and cabinet 18, are understood to be present as shown in FIG. 1 but are further omitted from the remaining figures and from discussion herein unless specifically stated otherwise.

Insertion system 10 may be generally understood to be a system 10 for use in inserting a fastener component into a molded part for use in the manufacture of another article. As used herein and described further below as washers 118 and brackets 140, the specific fastener component and molded part may vary and may include any suitable component and molded part combination as dictated by the desired implementation. Further, although described herein for the specific purpose of inserting fastener components such as washers 118 into molded parts, such as brackets 140, system 10 will be understood to be suitable for other similar applications including, but not limited to, inserting other mechanical fastener parts such as nuts or the like into molded parts as well as other similar applications. As will be recognized from the disclosure herein, system 10 may provide for automated, repeatable, fast, precise, and safer operation than current systems and methods for combining a mechanical fastener component to a molded part.

With reference now to FIGS. 2-5, at its most basic, washer insertion system 10 may provide an insertion assembly (discussed below as insertion assembly 94) that is movable in three axes, namely, transversely along an X axis, longitudinally along a Z axis, and vertically along a Y axis to allow for precision movement thereof as discussed further below. Accordingly, as used herein, references to the X axis are generally understood to refer to the horizontal or transverse direction relative to the components of system 10. Similarly, references to the Y axis will be understood to refer to the vertical direction while references to the Z axis will be understood to refer to longitudinal or the front to back direction relative to the components of system 10.

Accordingly, system 10 may have a first side 22 spaced apart from a second side 24 and defining the transverse direction (X axis) therebetween. System 10 may further include a front 26 spaced longitudinally apart from a back 28 and defining the longitudinal direction (Z axis) therebetween. System 10 may likewise include a top 30 spaced apart from a bottom 32 and defining the vertical direction (Y axis) therebetween.

System 10 may include a support frame 34, which may sit on or otherwise be connected to work surface 20 through any suitable means. According to one aspect, support frame 34 may be bolted, riveted, or the like to work surface 20. Support frame 34 may have at least one base plate 36, a plurality of vertical supports 38, and at least one top plate 40 therein. As shown and described, support frame 34 may have two sides, namely a first side 34A on first side 22 of system 10 and a second side 34B on second side 24 of system 10. Each respective side of support frame 34A and 34B may include base plates 36A and 36B, respectively. Similarly, support frame 34 may have a first top plate 40A at first side 34A and a second top plate 40B at second side 34B. Base plates 36 and top plates 40 may be substantially similar in construction and installation, but may vary in size, shape, or orientation as dictated by the particular installation of system 10. For example, as discussed below, system 10 may include a plurality of motors therein, and base plates 36 and/or top plates 40 may be modified to support such motors while remaining substantially similar in other aspects. Base plates 36 and top plates 40 may be vertically separated by a plurality of vertical supports 38 which may allow sufficient vertical height to support frame 34 above work surface 20 such that system 10 may have sufficient clearance for proper operation thereof. As system 10, as a whole, may be scaled in size to accommodate variously sized molded parts, support frame 34 may likewise be scaled in size, including in width, height, and relative strength, as dictated by the desired implementation.

Support frame 34 and the components thereof may be formed of any suitable material or materials, including, but not limited to, metal, high density polymers, plastics, or other similar materials, or combinations thereof, provided the materials are of sufficient size and strength to support the weight and function of system 10.

System 10 may include a sled 42, which may carry the remaining components of system 10 and may further serve as the attachment between such components and the support frame 34. Sled 42 may further include a first sled plate 44 at first side 22 of system 10 and a second sled plate 46 disposed at second side 24 of the system 10. First and second sled plates 44 and 46 may be connected by one or more cross members 48 to allow rigid support and simultaneous movement thereof. Sled 42 may be formed of any suitable material or combination of materials suitable to support the remaining components of system 10 thereon, as discussed herein.

As shown and described herein, first and second sled plates 44 and 46 may be generally planar and may be generally parallel to top plates 40A and 40B of support frame 34. Cross member 48 may generally be an L-shaped or similarly-shaped rigid structure having a front plate 50, which may further support additional components thereon as discussed below, and a base 52, which may be generally horizontal and may be the portion of cross member 48 fixedly attached to first and second sled plates 44 and 46. Cross member 48 may further include any suitable support members as desired, including, for example, triangular braces 54, which may further provide support and rigidity to sled 42 and the other components of system 10 discussed below.

Sled 42 may be longitudinally movable along the Z axis relative to support frame 34 and may be movably connected thereto through one or more longitudinal sliders 56 disposed on a bottom side of each of first and second sled plates 44 and 46. Longitudinal sliders 56 may further interact with one or more longitudinal rails 58, which may be attached to, or integral with, top plates 40 of support frame 34. The longitudinal sliders 56 and longitudinal rails 58 may slidably interact with each other to facilitate the longitudinal movement of sled 42 and thereby system 10.

Longitudinal sliders 56 may be constructed of any suitable material and may be configured to connect to longitudinal rails 58 in a manner as to prevent accidental removal of sled 42 from support frame 34 while simultaneously facilitating the longitudinal movement of system 10. Longitudinal sliders 56 may include one or more anti-friction surface, coatings, inserts, or the like to reduce or eliminate friction between longitudinal sliders 56 and longitudinal rails 58. Longitudinal rails 58 may be constructed of any suitable material and may likewise configured to interact with longitudinal sliders 56 to prevent accidental disconnections therewith. Longitudinal rails 58 may similarly include one or more anti-friction surface, coatings, inserts, or the like to further reduce or eliminate friction with longitudinal sliders 56.

To facilitate longitudinal movement of sled 42, system 10 may further include a first motor 60 and first leadscrew assembly 62, which may be in operable connection between one of the top plates 40 and the sled 42.

First motor 60 may be any suitable motor size and type to provide power to first leadscrew assembly 62, including electric servo motors or the like. First leadscrew assembly 62 may be any type of mechanical screw-type actuator including ball screws, roller screws, or the like. First motor 60 and first leadscrew assembly 62 may be operated according to their normal and expected function to provide front-to-back longitudinal movement of sled 42, and may further include any necessary elements to facilitate such operation. According to another aspect, first motor 60 and first leadscrew assembly 62 may be any suitable type of mechanical actuator or similar device operable to facilitate the longitudinal movement of sled 42 and system 10.

As mentioned above, sled 42 may support additional components of system 10. In particular, cross member 48 of sled 42 may support a second motor 64 and second leadscrew assembly 66 thereon. Second motor 64 may be substantially similar to first motor 60 and may be any suitable motor size or type. Similarly, second leadscrew assembly 66 may be substantially similar to first leadscrew assembly 62 and may be any suitable type of mechanical screw-type actuator. Second motor 64 and second leadscrew assembly 66 may be operated according to their normal and expected function to provide side-to-side transverse movement of system 10 and may further include any necessary elements to facilitate such operation, as discussed further herein. According to another aspect, second motor 64 and second leadscrew assembly 66 may be any suitable type of mechanical actuator or similar device operable to facilitate transverse movement within system 10.

Front plate 50 of cross member 48 may have one or more transverse rails 70 for slidable engagement with one or more transverse sliders 68 to provide movement along the X axis. In particular, transverse rails 70 may be fixedly attached to front plate 50 of cross member 48 while transverse sliders 68 may be attached to a carriage plate 72 opposite from cross member 48. Transverse sliders 68 and transverse rails 70 may be substantially similar or identical to longitudinal sliders 56 and longitudinal rails 58 but for their placement and orientation within system 10.

Carriage plate 72 may be an elongated frame member or plate that may extend vertically between the first and second sled plates 44 and 46 and may be connected on a back side (i.e. oriented towards the back 28 of system 10) thereof to the cross member 48 via the transverse sliders 68 and transverse rails 70. Carriage plate may be formed of any suitable material or combination of materials suitable to connect the sled 42 to the remaining components of system 10, as discussed herein.

Carriage plate 72 may further support or include a third motor 74 and third leadscrew assembly 76 thereon that may be positioned and arranged to provide vertical movement about the Y axis within system 10, as discussed below. As with first and second motors 60 and 64, third motor 74 may be substantially similar and may be any suitable motor size or type. Similarly, third leadscrew assembly 76 may be substantially similar to first and/or second leadscrew assembly 62 and/or 66 and may be any suitable type of mechanical screw-type actuator. Third motor 74 and third leadscrew assembly 76 may be operated according to their normal and expected function to provide vertical movement of system 10 and may further include any necessary elements to facilitate such operation, as discussed further herein. According to another aspect, third motor 74 and third leadscrew assembly 76 may be any suitable type of mechanical actuator or similar device operable to facilitate transverse movement within system 10.

A front side (i.e. towards front 26 of system 10) of carriage member 72 may further include one or more vertical rails 78 which may operable engage one or more vertical sliders 80 disposed on a vertical support plate 82 opposite the front side of carriage member 72. Accordingly, vertical support plate 82 may be vertically movable relative to carriage plate 72 along the Y axis through operation of third motor 74 and third leadscrew assembly 76 as discussed further herein.

Vertical sliders 80 and vertical rails 78 may be substantially similar or identical to longitudinal and/or transverse sliders 56 and/or 68 and longitudinal and/or transverse rails 58 and/or 70 but for their placement and orientation within system 10

The combination of longitudinal, transverse, and vertical sliders 56, 68, and 80 and rails 58, 70, and 78 may allow for the previously mentioned three-axis movement of insertion system 10 as discussed further in relation to the operation of system 10 below.

A front side (i.e. towards front 26 of system 10) of vertical support plate 82 may further include one or more spacers 84 further connecting to an insertion plate 88 thereon. Vertical support plate 82, spacers 84, and insertion plate 88 may define a channel 86 therebetween to provide clearance for a belt and pulley system 96, as discussed below. Vertical support plate 82 may further include or otherwise carry an insertion motor 90 and insertion motor support arm 92 thereon for operable connection to belt and pulley system 96.

Insertion motor 90 may be any suitable motor or motor type including, but not limited to, a servo motor, operable to rotate a pulley and/or pulleys of belt and pulley system 96. According to one aspect, belt and pulley system 96 may be any suitable belt and pulley system 96 including rubber, nylon, chain, or the like and may be operable to rotate insertion bracket 102 of insertion assembly 94 as discussed further herein. Belt and pulley system 96 may operate according to its normal and expected function to provide 360° rotation of the insertion bracket 102 in either direction and may further include any required or necessary components and/or elements to facilitate such operation. According to another aspect, belt and pulley system 96 may be any suitable system operable to rotate the insertion bracket 102, as described herein.

Figure 4:
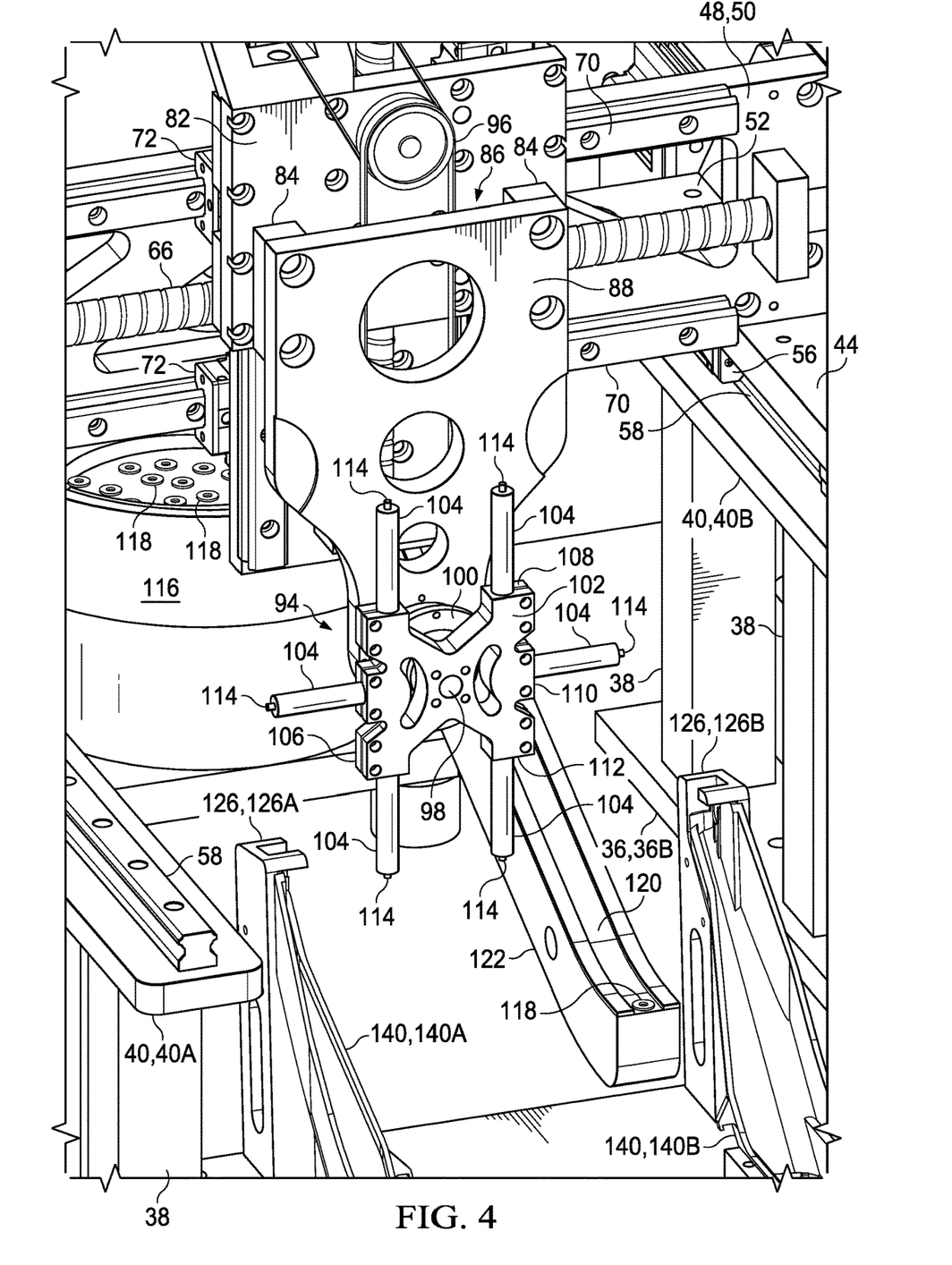
FIG. 4 (FIG. 4) is an enlarged front side isometric perspective view of an insertion assembly according to one aspect of the present disclosure.
Figure 5:
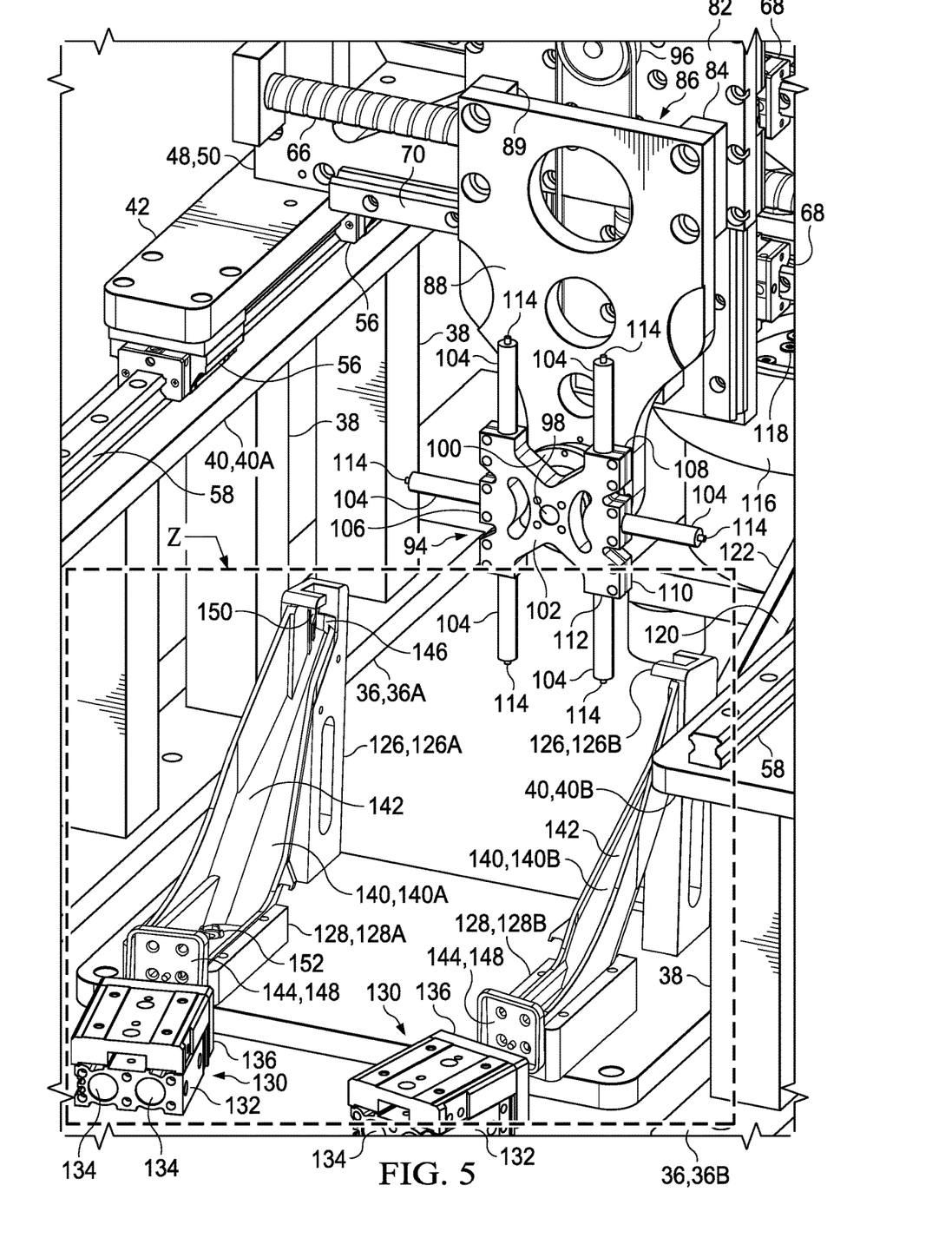
FIG. 5 (FIG. 5) is an enlarged front side isometric perspective view of an insertion system according to one aspect of the present disclosure.

With reference to FIGS. 4 and 5, insertion assembly 94 may generally be the main operational component of insertion system 10 in that insertion assembly 94 may directly interact both with washers 118 (or other similar components to be married with a molded product) and also with the molded product itself. Insertion assembly 94 may include a drive shaft 98 and bearing assembly 100 for operable connection to belt and pulley system 96 to allow rotational movement thereof, as discussed below.

Insertion assembly 94 may further include an insertion bracket 102, which may serve to connect drive shaft 98, and bearing assembly 100 to a plurality of insertion arms 104. Insertion bracket 102 may generally be square or rectangular in shape and may have a first side 106, a second side 108, a third side 110, and a fourth side 112. As the insertion bracket 102 may rotate 360° in either direction, as discussed below, each of first through fourth sides 106-112 may be any side of the bracket 102, depending on the orientation thereof. Each of first through fourth sides 106, 108, 110, or 112 may support one or more insertion arms 104 extending therefrom. Sides 106, 108, 110, and 112, and thereby insertion bracket 102, may have any suitable profile such as the general butterfly shape as shown herein or any other suitable profile as dictated by the desired implementation. The specific shape and material for insertion bracket 102 may be selected according to the desired implementation based on considerations such as size, weight, balance, and number of insertion arms 104 to be used therewith.

As shown, and according to one aspect, first side 106 and third side 110 may each have one insertion arm 104 thereon, while second and fourth sides 108 and 112 may have two arms 104 thereon. In this example, first and third sides 106 and 110 and their associated arms 104 may interact with brackets 140 to provide a washer 118 to the washer receiving slot 150 while second and fourth sides 108 and 112 and their associated arms 104 may interact with brackets 140 to provide a washer 118 to the washer receivers 152 and 154, as discussed below.

Insertion bracket 104 may have a generally hollow interior, or may alternatively include one or more channels defined therein for operable connection with insertion arms 104 to allow use of pneumatic and/or vacuum systems, as discussed further below.

Each side 106, 108, 110, and 112 of insertion bracket 102 may include or otherwise define one or more operable connection points which may operably engage with one or more insertion arms 104. The specific number of insertion arms 104 provided may vary depending on the specific implementation of system 10 and may be determined by the number of fastener components desired to be inserted within a particular molded part. For example, as shown and described herein and as discussed further below, the molded product may be a bracket 140 accepting three washers 118. Accordingly, in this example, insertion bracket 102 may have six insertion arms 104 operationally connected thereto allowing system 10 to combine six washers 118 with two brackets 140 simultaneously.

Insertion arms 104 may be generally cylindrical or have any other suitable profile as desired and may be constructed of any suitable material, including steel or other metals, polymers, or the like. Arms 104 may include one or more systems to assist or otherwise facilitate temporary engagement with one or more fastener components, such as washers 118. According to one example, insertion arms 104 may include or otherwise be in communication with one or more pneumatic and/or vacuum systems, which may facilitate the arm's 104 ability to pick up and carry a washer, as discussed below. For example, insertion arms 104 may permit a slight vacuum to be applied to the washer 118 as it is in connection with a tip 114 of the insertion arms 104. This may serve to temporarily facilitate the engagement of the insertion arms 104 with the washers 118, as discussed below. According to another aspect, insertion arms 104 may be magnetized, may utilize a mechanical connection, or may utilize any other suitable engagement system and/or suitable combinations thereof.

According to the example provided herein where the fastener component is a washer 118, insertion arms 104 may further include an extendable or retractable tip 114, which may interact with a central opening in washers 118 to further secure washers 118 thereon during operation.

As described herein, system 10 may include one or more electrical, pneumatic, hydraulic, or other similar secondary components and/or systems therein. System 10 is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of system 10 may be integrally formed as a single unit.

Figure 6:
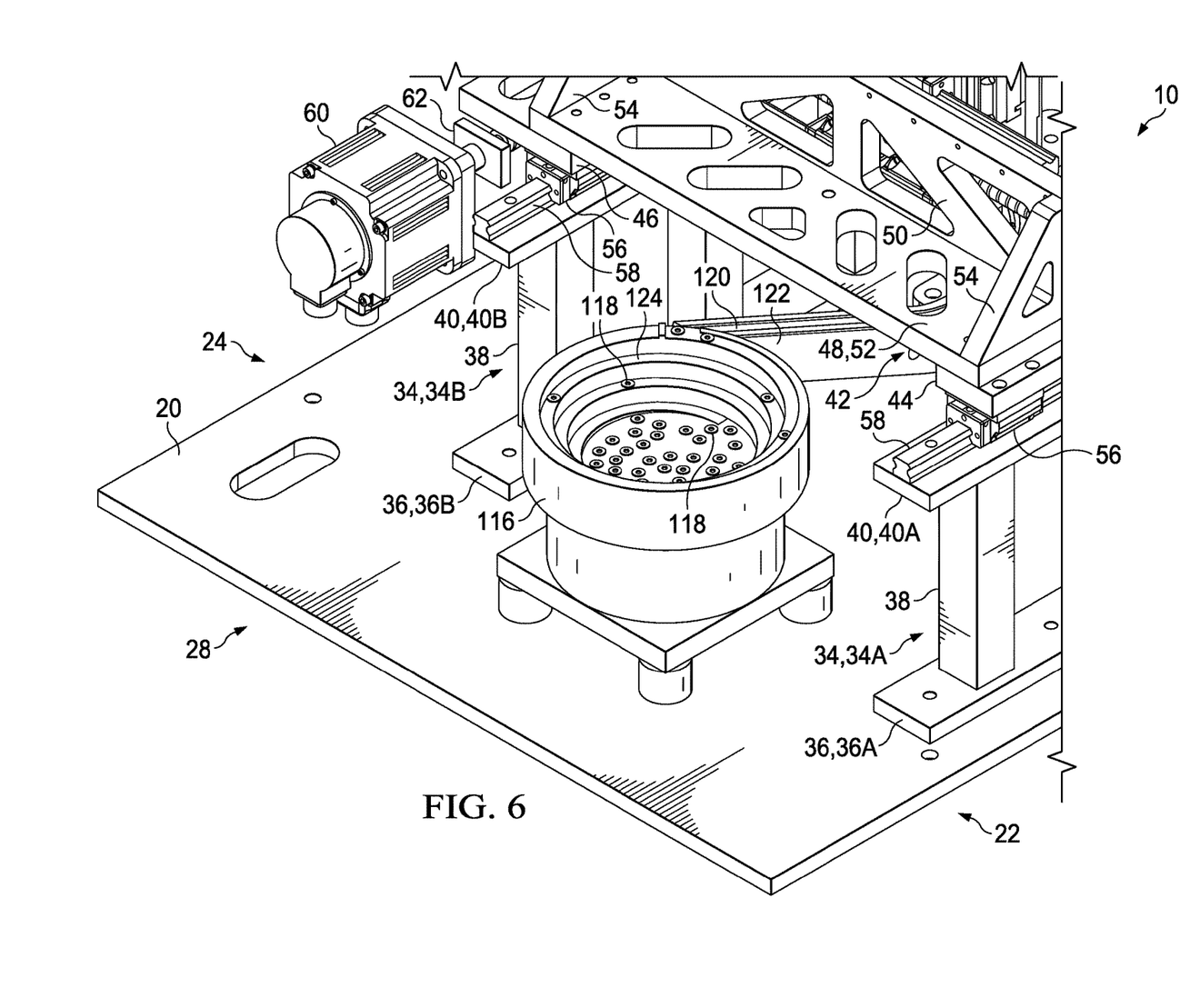
FIG. 6 (FIG. 6) is a top rear isometric view of an insertion system according to one aspect of the present disclosure.

With reference to FIGS. 4-6, and with particular reference to FIG. 6, system 10 may further include a washer hopper 116, which may store and distribute washers 118 into a washer channel 120 and rail 122 combination. Hopper 116 may be any suitable type hopper system including vibratory hoppers or the like, which may be operable to both contain and/or store a plurality of washers 118 therein while simultaneously separating and delivering washers 118 to channel 120 in washer rail 122 for delivery to insertion assembly 94. According to one aspect, hopper 116 may vibrate and/or rotate to deliver washers up to channel 120 via a spiral or stepped sidewall 124, which may allow washers 118 to separate and move up the sidewall and into channel 120. Washers 118 that fail to enter channel 120 may be recirculated through hopper 116 for redistribution or later use.

Hopper 116 may be supported by or otherwise connected to work surface 20 in a suitable position to provide the washer rail 122 in close proximity to the insertion assembly 94 for operational connection therebetween, as discussed further below.

With continued reference to FIGS. 4-6, and with particular reference to FIG. 4, a washer 118 may be delivered from hopper 116 and down channel 120 to a front end of washer rail 122 before coming to rest and being positioned for operable engagement with insertion arms 104 of insertion assembly 94, as discussed further with regards to the operation of system 10 below.

With continued reference to FIGS. 4-6, but as best seen in FIG. 5, a forward central area between the first and second support frame sections 34A and 34B and longitudinally forward of insertion assembly 94 may generally be the main "work area" of insertion system 10. Put another way, this area between the support frame 34A and 34B sections, and in front of insertion assembly 94, may be where the washers 118 are operably married with the molded components as dictated by the desired implementation.

This operational area of system 10, shown in FIG. 5 as assembly zone Z, may further include at least one first support 126 and at least one second support 128. First support may be an upright support 126 or similar support while second support 128 may be a lower or bottom support for a molded part, such as bracket 140, as shown. First and second support 126 and 128 may be provided in any suitable position or arrangement to accommodate a molded part as discussed further herein.

As shown, and according to one example, where the molded parts being used are brackets 140, a plurality of first supports 126 and second supports 128 may be provided to allow multiple molded parts to be married to washers 118 as desired.

System 10 may further include a press assembly 130, which may include a base 132, one or more piston assemblies 134, and a front plate 136. Where multiple molded parts may be assembled and/or married to washers 118 simultaneously within system 10, a plurality of press assemblies 130 may be provided. Press assembly 130 may be a standard actuator assembly in that piston assembly 134 may drive front plate 136 to combine an additional component such as a foot or pad 138 to a molded part such as bracket 140, as discussed further herein.

Figure 7:
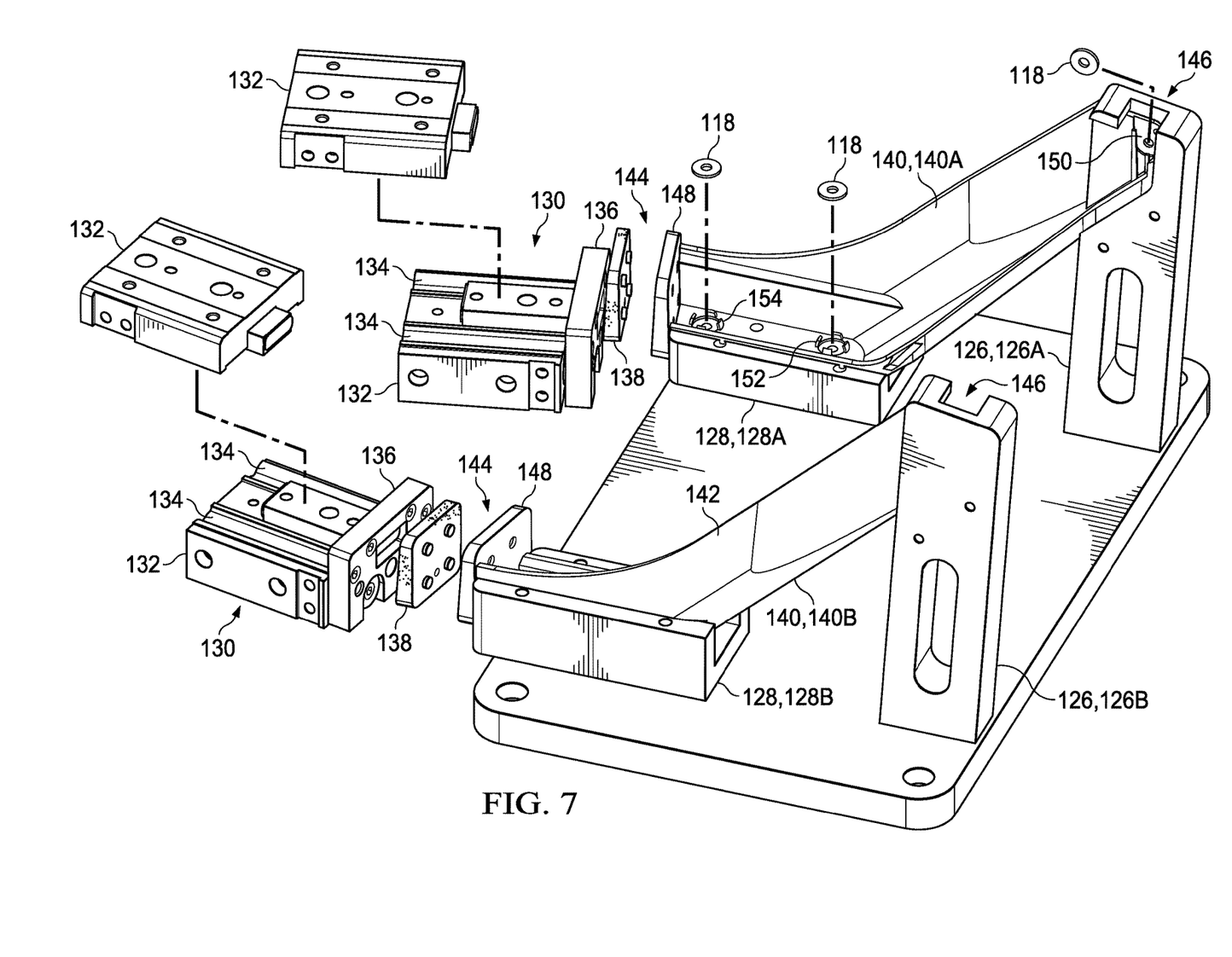
FIG. 7 (FIG. 7) is an isometric perspective exploded view of a bracket and foot assembly according to one aspect of the present disclosure.

With reference to FIG. 7, as mentioned above, one example of a molded part utilized with insertion system 10 may be a ladder bracket 140 which may be further assembled with other ladder components to provide stability and support thereto while simultaneously providing a non-skid or textured foot 138 to assist and/or prevent an associated ladder from movement across a surface when being used. According to this example, bracket 140 may be or include a first bracket 140A, which may be a left side bracket, and a mirror imaged second bracket 140B, which may be a right side bracket, when viewed from the front 26 of system 10.

Other than this mirror imaged arrangement, brackets 140A and 140B may be substantially identical and may include a body 142 having a first end 144 and base 148 section, which may interact or otherwise be in operational engagement with foot 138. Body 142 may further include a second end 146 opposite the first end 144 and may include a washer receiving slot 150 defined therein. Body 142 of bracket 140 may further include one or more washer receivers, shown and discussed herein as first washer receiver 152 and a second washer receiver 154.

As will be understood with regards to insertion assembly 94, the number of washer receivers provided in body 142 may be dependent upon the specific type of molded product being utilized, of which bracket 140 represents a single non-limiting example thereof. According to another example, the molded part may be a tray or the like, and may have any suitable number of washer receivers and/or washer receiving slots defined therein, as dictated by the desired implementation. Further, the molded part may include other component receivers, or may omit one or more receivers, including base 148 and foot 138, as desired or dictated by the specific implementation of system 10. It will again be understood that system 10 may be readily scaled and adapted for use with other molded parts and the like.

Having thus described the elements and components of insertion system 10, the operation and method of use therefore will now be discussed.

Some of the components of insertion system 10 may be best understood through a discussion of the operation of system 10 and may be further described below in more detail, where relevant. Further, it will be understood that the method of use described herein is directed to an embodiment wherein a molded product being married to a fastener component consists of bracket 140 and washers 118; however, it will be understood that the methods of use described herein may be readily adapted for use with insertion system 10 alongside other similar molded parts and/or fastener components such as nuts, bolts, or the like. Similarly, insertion system 10 may be utilized to further combine additional parts together, for example, in place of foot 138 and bracket 140. However, for purposes of consistency, simplicity, and clarity in this disclosure, the method of use will now be described with reference to washers 118, foot 138, and bracket 140.

Figure 8:
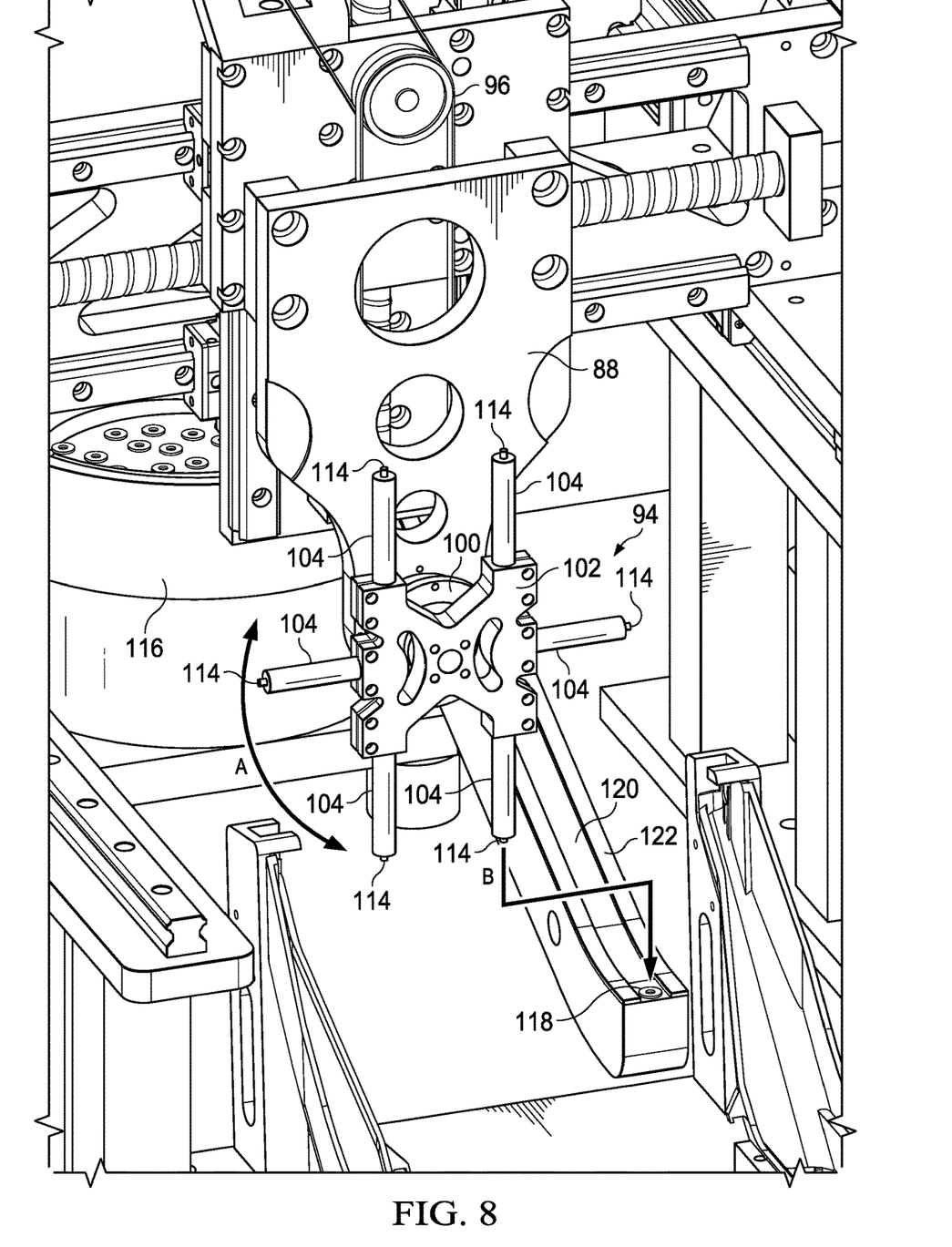
FIG. 8 (FIG. 8) is an enlarged front side isometric perspective operational view of an insertion system according to one aspect of the present disclosure.
Figure 9:
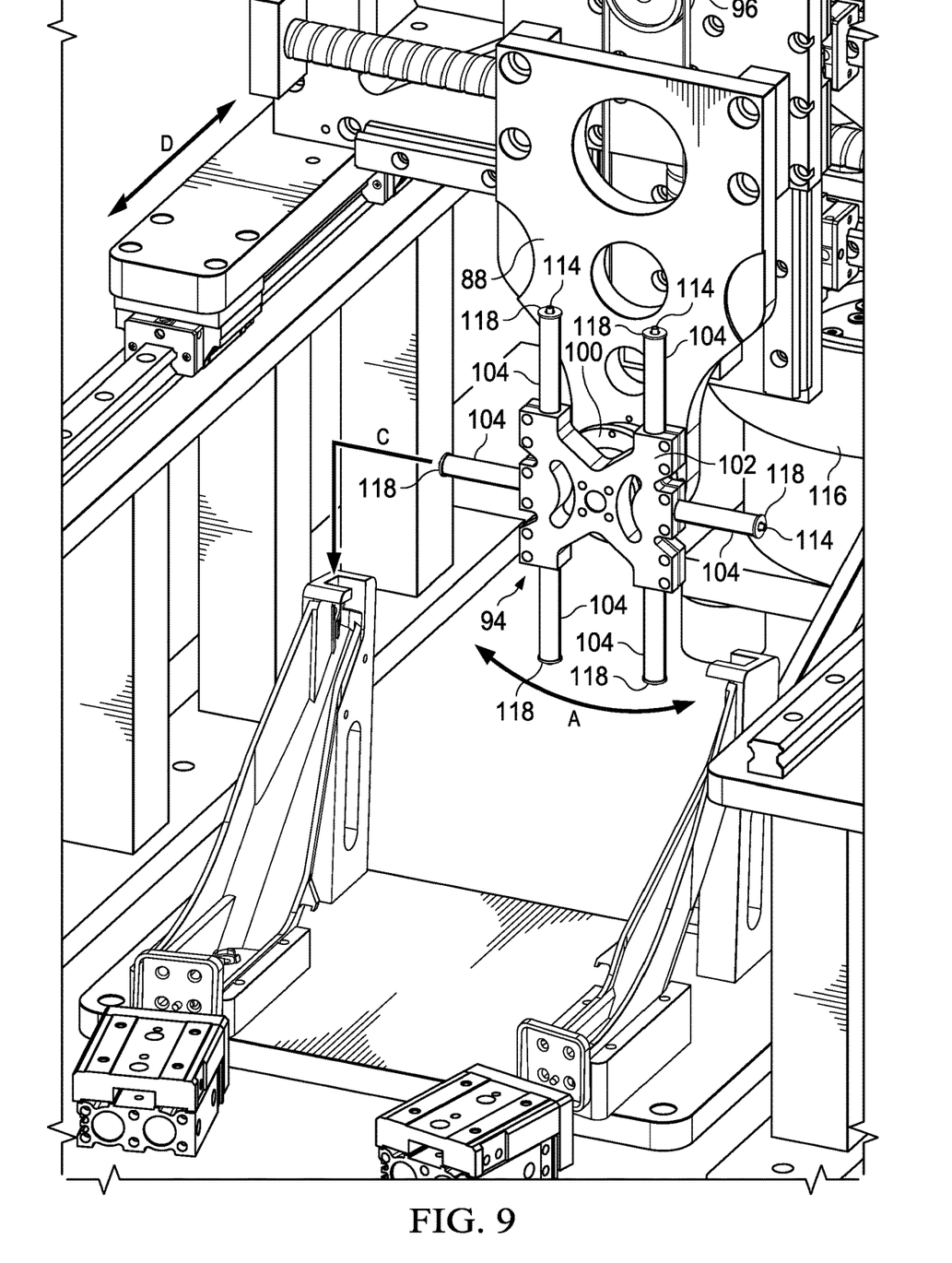
FIG. 9 (FIG. 9) is an enlarged front side isometric perspective operational view of an insertion system according to one aspect of the present disclosure.

With reference to FIGS. 8 and 9, as discussed above, insertion assembly 94 may represent the predominant functional portion of insertion system 10. As discussed previously herein, insertion assembly 10 may be capable of motion in three axes, namely, the X axis defined as the transverse or horizontal axis, the Y axis defined as the vertical axis, and the Z axis defined as the longitudinal axis.

In particular, insertion assembly 94 may be moved between various positions within the assembly zone Z depending on the specific point in the process and the desired function at that particular point. Accordingly, insertion assembly 94, or more particularly insertion bracket 102 and insertion arms 104 may move in all three axes through operation of first, second, and third motors 60, 64, and 74 and first, second, and third leadscrew assemblies 62, 66, and 76. Inserted bracket 102 may further rotate about a longitudinal axis defined by insertion drive shaft 98. This rotation may be accomplished utilizing belt and pulley assembly 96 with insertion motor 90. As best seen in FIG. 8, insertion bracket 102 may rotate about this longitudinal axis in either direction as indicated by Arrow A. The rotation of insertion bracket 102 may allow one or more of insertion arms 104 to interact with washers 118 to allow multiple washers 118 to be placed within brackets 140 as discussed further below.

Insertion bracket 102 may simultaneously be moved over and then down into contact with a washer 118 at the front end of washer rail 122 as indicated by Arrow B. As each individual insertion arm 104 comes into contact with washer 118, tip 114 thereof may insert into the central opening within the washer 118 while a slight pneumatic vacuum may be applied through the body of insertion arm 104 to further secure washers 118 to the tip 114 thereof. This movement may be repeated to engage each insertion arm 104 with a washer 108, as shown. In particular, each arm 104 may be moved into position, lowered to engage a washer 118, and then raised before moving the next insertion arm 104 into position to engage a washer. Where necessary, insertion bracket 102 may rotate to align the next of first, second, third, and fourth sides 106, 108, 110, and 112 and the associated insertion arms 104 in position above rail 122 to receive a washer 118.

Once each insertion arm 104 is engaged with a washer, as best seen in FIG. 9, insertion bracket 102 may then be moved to align an individual insertion arm 104 with washer receiving slot 150 of first bracket 140 and may then be moved downwards to deposit a washer 118 in the slot 150 of first bracket 140A. This is indicated in FIG. 9 at Arrow C. According to this example, first side 106 of bracket 102, and its associated insertion arm 104, may provide the first washer 118 into slot 150 of first bracket 140A.

This process may be repeated on the other side moving and rotating insertion bracket 102 to align a second insertion arm 104, such as the arm associated with third side 110 of bracket 102, with the washer receiving slot 150 on the second bracket 140B before lowering and placing washer 118 in the slot 150 thereof.

Subsequent washers 118 may be installed in a similar manner, by rotating insertion bracket 102 to position the next insertion arm 104 while moving the insertion assembly 94 in one or more of the X, Y, and/or Z axes to align the insertion arm 104 with a first washer receiver 152 of first bracket 140A before being lowered and washer 118 pressed into place. Again insertion assembly 94 and insertion bracket 102 may be moved to align with second washer receiver 154 of first bracket 140A.

Insertion assembly 94 may then be moved across the assembly zone Z to insert the next washer 118 into the similarly situated first washer receiver 152 and second washer receiver 154 in second bracket 140B.

Alternatively, insertion assembly 94 may insert washers 118 in a single bracket 140 at a time before moving on to the subsequent bracket 140. Put another way, insertion assembly 94 may insert a washer 118 into washer receiving slot 150, first washer receiver 152, and second washer receiver 154 of a first bracket 140 before repeating the process on the opposite with second bracket 140B. Similarly, washers 118 may be inserted into receiver slot 150 and receivers 152 and 154 of brackets 140 in any desired order. Where the molded parts include additional slots and/or receivers, the process described above may be repeated as needed.

According to another example, system 10 may process a single bracket at a time, or may alternatively process more than two brackets 140, or any suitable number of brackets 140, as desired.

At any point during the process of engaging washers 118 with insertion arms 104 and inserting them into their positions within brackets 140, press assembly 130 may engage a foot 138 with base 148 of both first and second brackets 140A and 140B. In particular, a foot 138 may be placed between the front plate 136 of press 130 and the base 148 of bracket 140. Once place, the piston assembly 134 may be activated and may press the foot 138 into engagement with the base 148 of bracket 140. Foot 138 may be attached through any suitable means, including, but not limited to, mechanical engagement (such as between projections on the foot 138 and apertures in the base 148, as shown) or through any other suitable means.

Once all brackets 140 within assembly zone Z have been engaged with washers 118 in all slots and/or receivers thereon, and the foot 138 has been installed in base 148, the brackets 140 may be removed from the assembly zone Z, and subsequent brackets 140 may be placed into the supports 126 and 128 and the process may be repeated for each subsequent bracket 140 provided within system 10.

Figure 10:
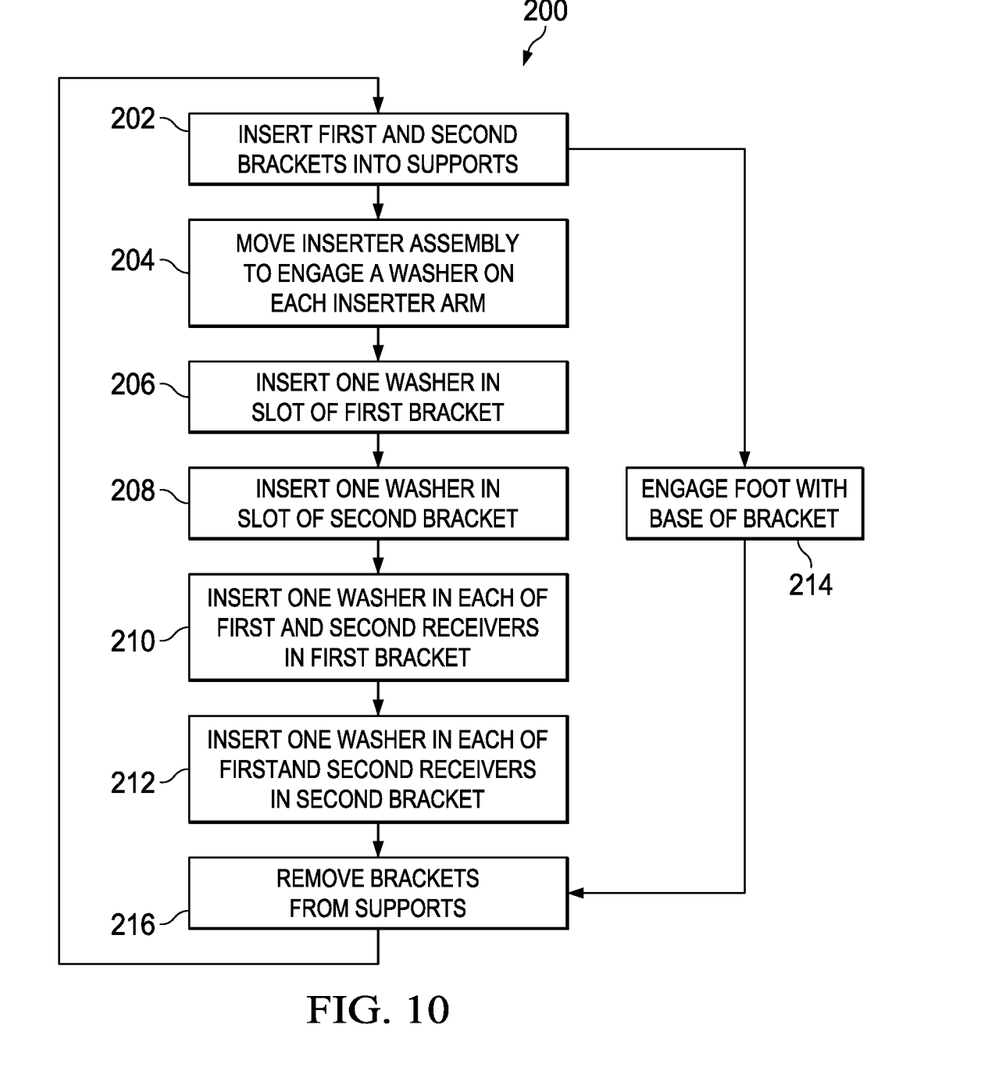
FIG. 10 (FIG. 10) is a flow chart representing a method of use of an insertion system according to one aspect of the present disclosure.

With reference to FIG. 10, the method of use described above is shown in an exemplary flow chart. In particular, the method of use is shown as process 200 and first includes the step of inserting the brackets 140 into supports 126 and 128 in the assembly zone Z. The insertion of brackets 140 into the supports 126 and 128 is shown at reference 202.

Once brackets 140 are secured within the assembly zone Z, the insertion assembly 94 can be moved to align each arm 104 of insertion bracket 102 with washers 118 and each insertion arm 104 may be engaged with a washer 118. This movement and engagement between arms 104 and washers 118 is shown at reference 204.

Next, at references 206, 208, 210, and 212, the insertion assembly 94 may insert one washer 118 into each receiving slot 150 and/or washer receiver 152, 154, in each bracket 140 within assembly zone Z. In particular, at reference 206, insertion assembly 94 may insert a washer 118 into slot 150 of first bracket 140A. Then, at reference 208, a washer 118 may be inserted into slot 150 of second bracket 140B. Next, at reference 210, washers 118 may be inserted into the receivers 152 and 154 of first bracket 140A before inserting washers 118 into receivers 152 and 154 of second bracket 140B.

These steps, namely the insertion of washers 118 into brackets 140 in steps 206, 208, 210, and 212, may occur simultaneously or in rapid succession in that washers 118 may be inserted into receiving slots 150 and/or washer receivers 152 and 154 of first and/or second brackets 140A and 140B in any order, including in alternating fashion. Accordingly, although shown as four steps in process 200, it will be understood that steps 206, 208, 210, and 212 may be performed as one single step in process 200, in any suitable order, and/or simultaneously, as desired.

At any point during the performance of steps 204, 206, 208, 210, and/or 212, a foot 238 may be installed into base 148 of brackets 140 utilizing press assembly 130 as described herein. The engagement of a foot 138 with base 148 of brackets 140 is shown at reference 214.

Finally, once all washers 118 have been inserted into receiving slots 150 and washer receivers 152 and 154 of each bracket 140 within assembly zone Z, and a foot 138 has been engaged with the base 148 thereof, the brackets 140 may be removed from the supports 126 and 128 and from assembly zone Z, as indicated at reference 216.

Once the brackets 140 are removed from assembly zone Z, process 200 may be repeated by inserting a new set of brackets 140 into supports 126 and 128.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method of combining a fastener component with a molded component comprising:
    inserting a molded component part into an assembly zone of an insertion assembly;
    engaging a first fastener component with a first insertion arm carried by an insertion bracket of the insertion assembly;
    rotating the insertion bracket to engage a second fastener component with a second insertion arm of the insertion bracket;
    moving the insertion assembly in at least one of a transverse X axis, a vertical Y axis, and a longitudinal Z axis relative to a frame of the insertion assembly to align the first fastener component with a first receiver of the molded component part;
    inserting the first fastener component into the first receiver;
    rotating the insertion bracket;
    moving the insertion assembly in at least one of the transverse X axis, the vertical Y axis, and the longitudinal Z axis relative to the frame of the insertion assembly to align the second fastener component with a second receiver of the molded component part; and
    inserting the second fastener component into the second receiver.

2. The method of claim 1 further comprising;
    rotating the insertion bracket to engage a third fastener component with a third insertion arm of the insertion bracket before moving the insertion assembly to align the first fastener component with the first receiver.

3. The method of claim 2 further comprising:
    rotating the insertion bracket;
    moving the insertion assembly in at least one of the transverse X axis, the vertical Y axis, and the longitudinal Z axis relative to the frame of the insertion assembly to align the third fastener component with a third receiver of the molded component part; and
    inserting the third fastener component into the third receiver.

4. The method of claim 1 wherein inserting the molded component part into the assembly zone of the insertion assembly further comprises:
    inserting a first molded component part into the assembly zone; and
    inserting a second molded component part into the assembly zone.

5. The method of claim 4 wherein the first receiver is defined in the first molded component part and the second receiver is defined in the second molded component part.

6. The method of claim 4 further comprising:
    engaging a plurality of fastener components with a plurality of insertion arms carried by the insertion bracket;

rotating the insertion bracket;
moving the insertion assembly in at least one of the transverse X axis, the vertical Y axis, and the longitudinal Z axis relative to the frame of the insertion assembly to align each fastener component with an associated receiver of the molded component part; and
inserting each fastener component into its associated receiver.

7. The method of claim 6 wherein at least one receiver associated with at least one of the plurality of fastener components is defined in the first molded component part and at least one additional receiver associated with at least another one of the plurality of fastener components is defined in the second molded component part.

8. The method of claim 7 wherein the plurality of fastener components are inserted into their associated receivers in the first and second molded component parts in any order.

9. The method of claim 1 further comprising:
placing at least one additional component into a press assembly; and
combining the one additional component with the molded component part.

10. The method of claim 1 wherein engaging the first and second fastener components with the first and second insertion arms further comprises:
applying a vacuum to a tip of the first insertion arm to temporarily engage the first fastener component therewith; and
applying a vacuum to a tip of the second insertion arm to temporarily engage the second fastener component therewith.

* * * * *